No. 684,833. Patented Oct. 22, 1901.
H. LEMP.
SPEED CHANGING DEVICE FOR SELF PROPELLING VEHICLES.
(Application filed Aug. 29, 1900.)
(No Model.) 3 Sheets—Sheet 1.
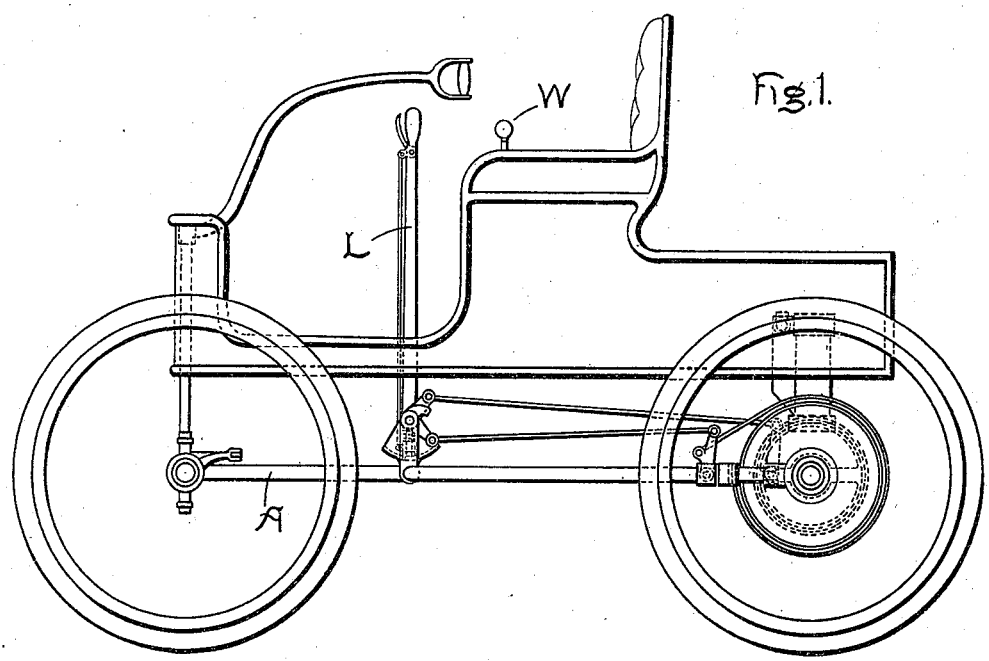
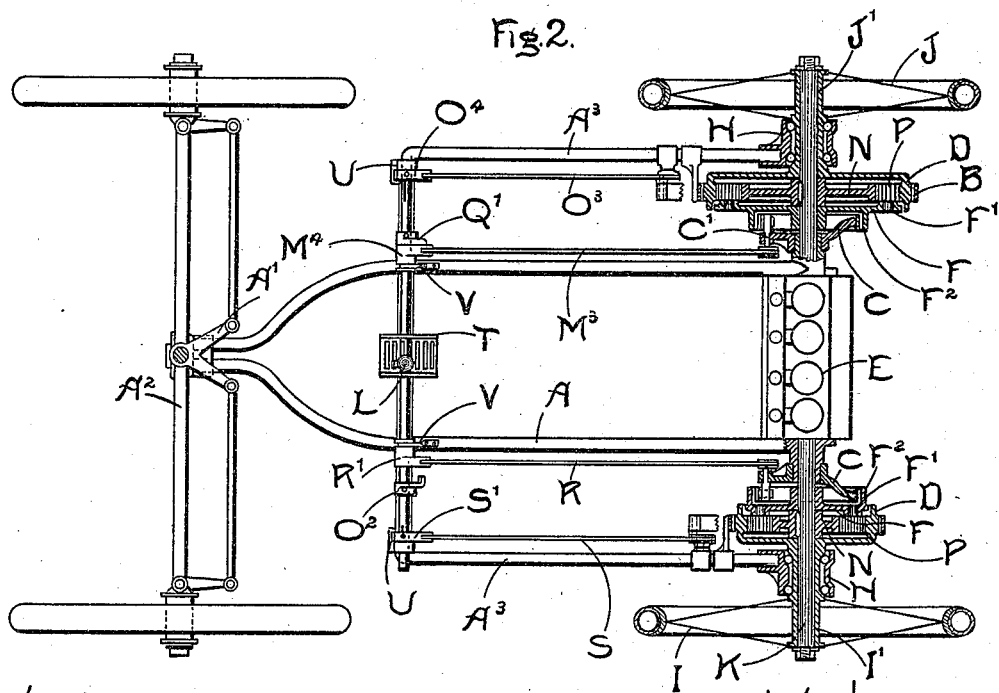
WITNESSES
Henry O. Westendarp
Alex F. Macdonald
INVENTOR
Hermann Lemp
by Albert G. Davis
Atty.

No. 684,833. Patented Oct. 22, 1901.
H. LEMP.
SPEED CHANGING DEVICE FOR SELF PROPELLING VEHICLES.
(Application filed Aug. 29, 1900.)
(No Model.) 3 Sheets—Sheet 2.
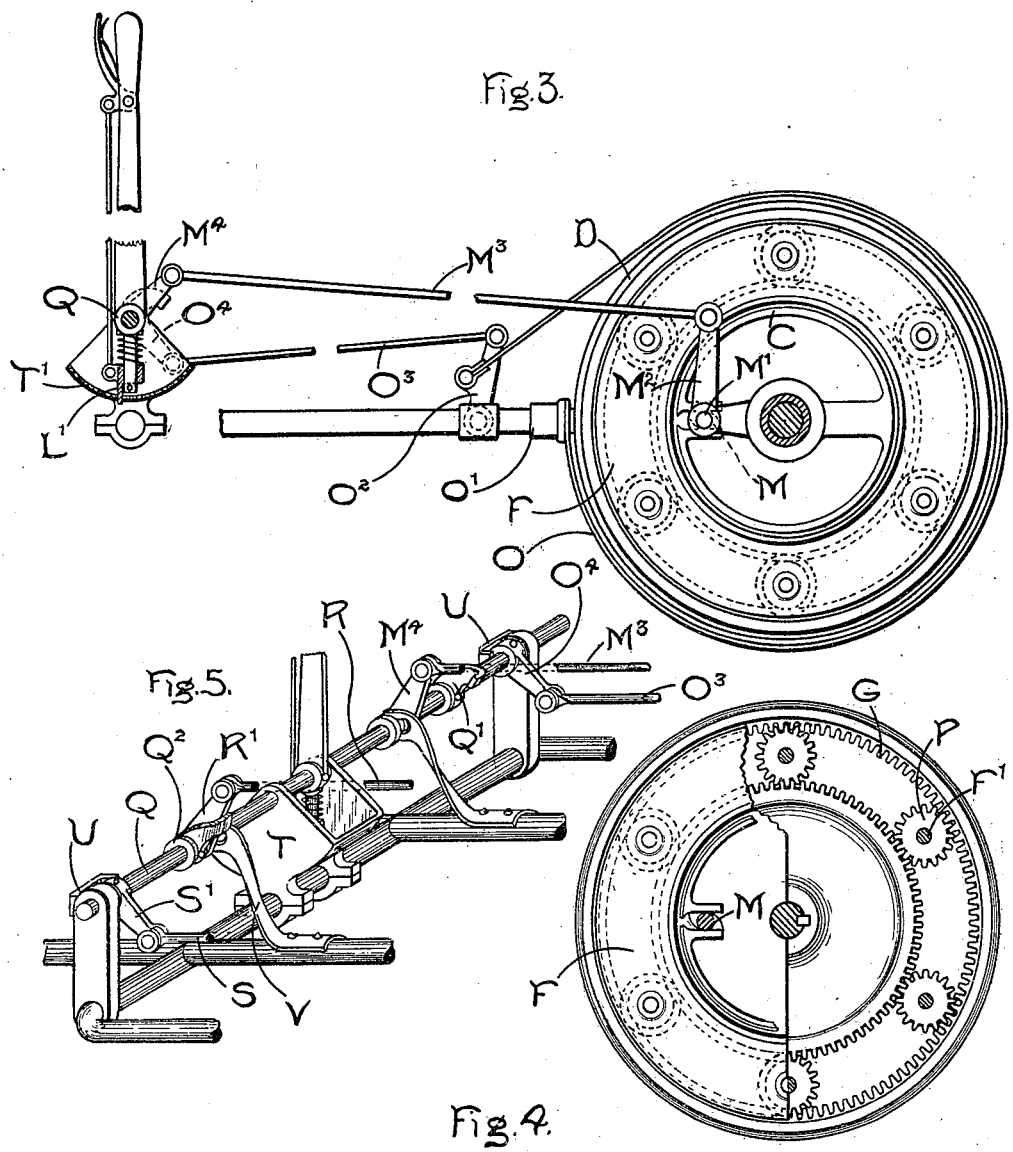

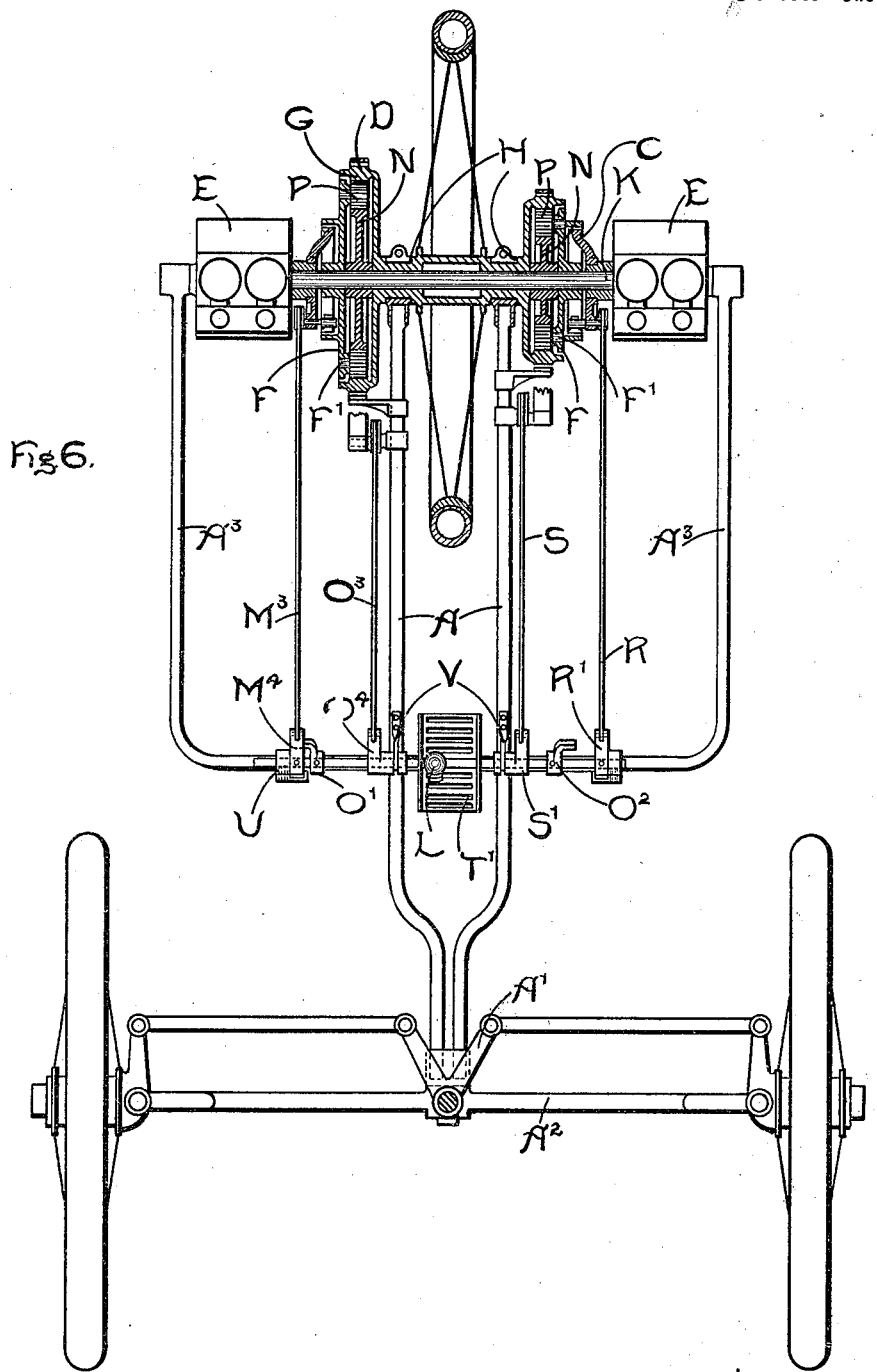

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

SPEED-CHANGING DEVICE FOR SELF-PROPELLING VEHICLES.

SPECIFICATION forming part of Letters Patent No. 684,833, dated October 22, 1901.

Application filed August 29, 1900. Serial No. 28,439. (No model.)

*To all whom it may concern:*

Be it known that I, HERMANN LEMP, a citizen of the United States, residing at Lynn, county of Essex, State of Massachusetts, have invented certain new and useful Improvements in Speed-Changing Devices for Self-Propelled Vehicles, (Case No. 1,259,) of which the following is a specification.

It is desirable to provide in connection with self-propelled vehicles a speed-changing mechanism by means of which the speed of the vehicle may be varied independently of the speed of the motive-power agency; and my present invention has for its object to provide such a speed-changing mechanism which is simple in construction and reliable in operation, as is more fully set forth and claimed hereinafter.

In the accompanying drawings, which illustrate an embodiment of my invention, Figure 1 is a side elevation of a self-propelled vehicle. Fig. 2 is a plan view, partially in section, of the framework and motive device. Fig. 3 is an enlarged view, in side elevation, of the speed-changing lever, clutch, and band-brake. Fig. 4 is an enlarged view, partially in side elevation and partially in section, of the clutch and gearing. Fig. 5 is a perspective view of the clutch and brake-operating mechanism; and Fig. 6 is a plan view, partially in section, of a slight modification of my invention in which the speed-changing mechanism is applied to a single driving-wheel instead of two, as in the other figures.

The vehicle-frame may be of any suitable construction, the one shown consisting of two parallel-extending bars A, which are rigidly secured at one end to the motive device or engine E and are sleeved on the axle and at the other end by a swivel-joint A' to the front axle $A^2$. The front axle is stationary, and mounted on the ends thereof are brackets for supporting the short axles of the steering-wheels. Uniting with the main frame-bars A and extending parallel therewith are bars $A^3$, which are provided at their ends with hangers H, containing ball-bearings for the driving-wheels I and J. The ball-bearings may be of any suitable construction and are not herein specifically described or illustrated.

The motive-power agency is here shown as consisting of a four-cylinder single-acting engine E, which may be of an oil, gas, or gasolene variety. Extending through the engine and forming a support for the driving-wheels is a shaft or axle K. This shaft is rigidly coupled to the pistons in the usual manner. Mounted on the ends of the shaft are two sleeves I' and J', the former being rigidly secured to the driving-wheel I, while the latter is secured to the driving-wheel J. Formed integral with each of these sleeves is a drum D, having internal gear-teeth G, Figs. 3 and 4. One of these drums is made larger than the other in order that the speed of one driving-wheel may be greater than the other; but otherwise their construction is the same, so that a detail description of one of them will be sufficient.

Sleeved on the engine-shaft K is a frame or disk F, and mounted on the frame on short studs or shafts F', Figs. 2, 3, and 4, are pinions P, meshing with the internal gear G on the drum and also with the spur-gear N, rigidly keyed to the engine-shaft K.

The frame or disk F is capable of rotating around the engine-shaft under certain conditions and is provided with an outwardly-extending hub $F^2$, which forms a part of a friction-clutch. The interior of the hub is preferably faced with leather or some similar material in order to present a good friction-surface for the stationary expansible clutch member C. This expansible clutch member is bored centrally to receive the engine-shaft and is rigidly mounted on a hub or extension forming a part of the engine-frame. The construction shown is a desirable one, since it tends to the simplicity of parts and also to compactness; but the clutch member may be supported from the frame-bars, if desired. The rim of the clutch member is split on one side of the center, and mounted in the space thus formed is an actuator M, which consists of two short arms arranged to engage the rim on opposite sides of the split. The actuator, Figs. 3 and 4, is mounted on the end of the rock-shaft M', which has a bearing in an extension C', Fig. 2, formed integral with the hub of the non-rotatable part of the clutch, and the shaft is rocked or moved by the arm $M^2$ and the rod $M^3$, the latter being connected to the lever L.

The periphery of the drum is turned true, and arranged to engage therewith is a brake-band O, Fig. 3. One end of the band is secured to a holder O', carried by a frame-bar, while the other end is secured to a lever $O^2$, which is pivotally secured to said frame-bar. For the purpose of throwing one set of gears or the other into operative relation with respect to the engine and also for applying the brakes, a lever L is employed, and the construction and arrangement of this device is best shown in Figs. 3 and 5. Extending across the vehicle-frame and parallel therewith is a rock-shaft Q, which is also capable of lateral movement. This shaft is supported at its ends by suitable bearings and is also supported at points intermediate the ends by a frame T. The frame, in addition to supporting the shaft, forms a part of a lever-locking device by reason of the slots T', with which the latch-pin L' engages.

Mounted on the rock-shaft Q are levers S' and R' for respectively operating the brake and the clutch for the driving-wheel I and also the levers $M^4$ and $O^4$ for respectively operating the clutch and brake for the driving-wheel J. The levers S' and $O^4$ are splined on the shaft and are prevented from moving endwise by the L-shaped pieces U, while the levers R' and $M^4$ are prevented from moving endwise by the arms V, which straddle slots in the hubs of said levers and are secured to frame-bars A. Rigidly mounted on the rock-shaft are two dogs Q' and $Q^2$, the former being arranged to move endwise in front of lever $M^4$, while the latter moves endwise in front of lever R', the object being to transmit motion from the hand operating-lever L to the clutch-actuating rods $M^3$ and R. The power of the engine is controlled by a throttle W, of any suitable construction, Fig. 1, and while no means are shown in the present instance for reversing the engine, it not being considered necessary on account of the lightness of the vehicle, it is to be understood that such means may be used, if desired. No automatic regulating means are shown for preventing abnormal speeds; but any desirable means may be employed.

Assuming that it is desired to start the vehicle, energy in some form or other is admitted to the motive-power agent E by the throttle W. This causes the shaft K to revolve; but with the lever L in the central position no movement of the vehicle takes place, as the frames or disks F will run free. Assuming that it is desired to start at the lower speed, the lever L is first shifted to the right, which moves the dog $Q^2$ and lever R' into operative position with respect to each other, after which the lever is moved forward, the latch L' being removed from the slots in the piece T' at the time. As pressure is gradually applied to the lever the tension on rod R becomes greater, and the actuator M' in turning expands the split pulley until finally the rotation of the frame or disk F is stopped. This represents the maximum speed for the driving-wheel I. By reason of the slipping of the friction-clutch the start may be made in a smooth and easy manner. One point of advantage in this arrangement lies in the fact that the clutch parts remain stationary after the maximum speed is attained, and this without increased friction in the bearings, &c.

Assuming that it is desired to further increase the speed of the vehicle, the latch L' is raised and the handle is returned to its central or normal position, which releases the clutch for the driving-wheel I, allowing it to run free. The handle is then moved laterally to the left. This movement brings the dog Q' and lever $M^4$ into operative relation. The handle or lever L is then moved forward, and the clutch-controlling wheel J gradually reduces the speed of the frame F. As this decrease in speed continues the speed of the vehicle increases, until finally the frame F stops entirely, and at this point the vehicle will be traveling at maximum speed.

Assuming that it is desired to retard the movement of the vehicle, the handle or lever L is brought to its off position to release the driving-clutch and is then moved backward. This causes the rock-shaft Q to rotate the levers $O^4$ and S' slightly, which in turn tighten the brake-bands around the drums D.

With the construction described it will be seen that two separate and independent driving-wheels are provided, each capable of driving the vehicle at different rates of speed for a given engine speed, and that when one wheel is acting as a driving-wheel the other is running free. It will also be seen that a single control-lever actuates the speed-changing devices and also applies the brakes.

In Fig. 6 I have shown a slight modification of my invention, in which a single driving-wheel is employed in a vehicle of the tricycle type, and the clutches are so arranged that they act on opposite sides of the same wheel. The driving-wheel is provided with an elongated hub, on the ends of which are formed the drums D. The engine E is divided into two parts, one part being located on one side of the wheel, and the other part being located on the other side of the wheel. The drums are provided with internal gear-teeth G, and meshing therewith are pinions P, which are carried by the disk or frame F and in turn mesh with the spur-gears N, that are keyed to the engine-shaft K. The stationary elements of the clutches are mounted on hubs or extensions of the engine-frames; but instead of being between the drums, as in the other figures, they are located outside. The band-brakes, hand-lever, dogs, and system of levers being the same as in Fig. 2, further description is unnecessary.

The middle frame-bars A are seated in sockets H, which are bored out to receive the hub of the driving-wheel.

In starting and in changing speed the lever L is moved to one side and forward to throw in one driving mechanism and to the other side and forward to throw in the second driving mechanism. Moving the lever to a central position and pulling it back applies the brakes, as before. In this case, as before, the engine-shaft runs through the driving-wheel, the moving parts are concentric, and the clutch parts are stationary. It will be seen that in all cases the gears are balanced, which tends to reduce friction and noise.

What I claim as new, and desire to secure by Letters Patent of the United States, is—

1. In a self-propelled vehicle, the combination of a motive-power agency, a steering-wheel, a plurality of driving-wheels, each capable of driving the vehicle while the other or others are running free, means for transmitting motion from the motive-power agency to each of the wheels, and a device for simultaneously throwing one wheel into operative relation with the motive-power agency, and the other or others out of operative relation.

2. In a self-propelled vehicle, the combination of a motor, a steering-wheel, a pair of driving-wheels, and means for transmitting motion to one of said wheels at one rate of speed and to the other at a different rate of speed, the said means being so arranged that while one wheel is driving the vehicle the other is running free.

3. In a self-propelled vehicle, the combination of a motor, a pair of driving-wheels located on opposite sides of the vehicle, means for transmitting motion to one of said wheels at one rate of speed, means for transmitting motion to the other of said wheels at a different rate of speed, and means for disconnecting one of said means and connecting the other with the motor so that only one of said driving-wheels is in operation at a time.

4. In a self-propelled vehicle, the combination of a motor, a steering-wheel, a plurality of driving-wheels each arranged to drive the vehicle at a different rate of speed, and means for connecting the motor with each of the driving-wheels.

5. In a self-propelled vehicle, the combination of a driving-shaft, a gear carried thereby, a driving-wheel, a gear carried thereby, a frame or disk forming a part of a friction-clutch, a pinion mounted thereon which meshes with the gears, a stationary element forming a part of the friction-clutch, and means for forcing the two parts of the clutch into engagement with each other whereby motion is transmitted from the shaft to the driving-wheel.

6. In a self-propelled vehicle, the combination of a motor-shaft, driving-wheels concentrically mounted with respect thereto and capable of freely turning thereon, and means for transmitting motion from said shaft to the wheels.

7. In a self-propelled vehicle, the combination of a motor, a driving-shaft therefor, a pair of driving-wheels sleeved thereon and capable of moving independently thereof, each wheel being capable of moving at a speed differing from the other, means for holding the wheels in place, means for transmitting motion from the shaft to the wheels, and means for disengaging one wheel or the other from the driving-shaft as desired.

8. In a self-propelled vehicle, the combination of a driving-shaft, a wheel mounted to freely turn thereon, an internal gear rigidly connected to the wheel, a spur-gear mounted on the shaft, a frame sleeved on the shaft, pinions mounted on the frame and meshing with the gears, a clutch element revolving with the frame and pinions, a stationary clutch element, and means for locking the two parts of the clutch.

9. In a self-propelled vehicle, the combination of a driving-shaft, a pair of wheels sleeved thereon and retained in place thereby, a drum rigidly secured to each of the wheels and provided with a braking-surface and internal gear-teeth, a pair of spur-gears rigidly mounted on the driving-shaft and surrounded by the drums, a frame having a clutch-surface, a plurality of pinions carried by the frame and arranged to mesh with the spur-gear and internal gear-teeth, the said pinions being distributed around the frame in such a manner as to balance the strain between the parts, a clutch member engaging with the frame, and a band for exerting friction on the drum.

10. In a self-propelled vehicle, the combination of a pivoted lever which is capable of lateral and angular movement, a driving-shaft, a driving-wheel, gearing between the wheel and the shaft, means actuated by an angular movement of the lever for placing the gears in operative relation with the shaft, and means actuated by a lateral movement of the lever, for rendering the gears inoperative.

11. In a self-propelled vehicle, the combination of a rock-shaft, a lever for rocking the shaft and also for moving it laterally, levers secured to the shaft in a manner to rotate therewith, other levers sleeved thereon, means for moving the sleeved levers, a power-shaft, a driving-wheel, and means controlled by the levers for connecting and disconnecting the driving-shaft from the driving-wheel.

12. In a self-propelled vehicle, the combination of a rock-shaft, a lever for rocking the shaft and also for moving it laterally, levers loosely mounted on the shaft, arms rigidly secured to the shaft for actuating the loosely-supported levers, a driving-shaft, driving-wheels, separate means for transmitting motion from the shaft to the wheels at different rates of speed, means actuated by one of the loosely-mounted levers for throwing in one set of power-transmitting means, means actuated by the other loosely-mounted lever for throwing in the second power-transmitting means, the levers and arms on the rock-shaft being so arranged that when one of the power-transmitting means is in operative position, the second means is inoperative.

13. In a self-propelled vehicle, the combination of a rock-shaft which is capable of angular and lateral movement, a slotted frame through which the shaft passes, an operating-lever mounted on the shaft, a latch carried by the lever and arranged to enter the slots in the frame and prevent angular movement of the lever, a driving-shaft, a driving-wheel, a power-transmitting device between the shaft and wheel, and means actuated by the lever and rock-shaft for operatively connecting the shaft and wheel.

14. In a self-propelled vehicle, the combination of a driving-shaft, a driving-wheel, gearing between the shaft and wheel, a clutch member which carries a part of the gearing and under certain conditions moves therewith, a stationary clutch member which engages with the first, and means for locking the moving and stationary clutch members when it is desired to attain the maximum speed of said driving-wheel.

15. In a self-propelled vehicle, the combination of a driving-shaft, driving-wheels, motion-transmitting devices between the driving-shaft and the wheels, means for throwing the motion-transmitting devices into and out of operation, braking mechanism, and a single lever for controlling both the speed-changing device and the brake mechanism.

16. In a self-propelled vehicle, the combination of a driving-shaft, driving-wheels, gearing between the shaft and the wheels arranged concentrically with respect to the shaft, a brake-band also concentric with respect to the shaft, a clutch for throwing the gearing into and out of operation, and a lever for controlling the action of the gearing and the brake, which is so arranged that movement in one direction causes the gearing to be thrown into operation, while movement in the opposite direction applies the brake.

17. In a self-propelled vehicle, the combination of a driving-shaft, a pair of driving-wheels, one on each end of the shaft, separate sets of gearing between the engine-shaft and the driving-wheels, whereby different speeds may be obtained, a brake for each driving-wheel, and a single control-lever which is arranged to control both sets of speed-changing devices and also the brake mechanisms.

In witness whereof I have hereunto set my hand this 27th day of August, 1900.

HERMANN LEMP.

Witnesses:
DUGALD McKILLOP,
HENRY O. WESTENDARP.